United States Patent [19]

Hayman

[11] Patent Number: 4,502,507

[45] Date of Patent: Mar. 5, 1985

[54] SINGLE HANDLE FAUCET VALVE

[75] Inventor: Dennis J. Hayman, Plano, Tex.

[73] Assignee: United States Brass Corporation, Plano, Tex.

[21] Appl. No.: 583,835

[22] Filed: Feb. 27, 1984

[51] Int. Cl.³ .............................................. F16K 11/06
[52] U.S. Cl. ............................ 137/625.4; 137/625.17; 251/214
[58] Field of Search ............. 137/625.4, 625.17, 636.4, 137/636.2, 636.3; 251/235, 214

[56] References Cited

U.S. PATENT DOCUMENTS

| | | | |
|---|---|---|---|
| 3,384,119 | 5/1968 | Manoogian | 137/625.17 |
| 3,526,250 | 9/1970 | Miller | 137/625.4 |
| 3,543,799 | 12/1970 | Hayman | 137/625.17 |
| 3,680,592 | 8/1972 | Hayman | 137/625.4 |
| 3,794,074 | 2/1974 | Watts | 137/625.4 |
| 3,965,935 | 6/1976 | Morisseau | 137/625.4 |
| 4,226,260 | 10/1980 | Schmitt | 137/625.17 |
| 4,325,403 | 4/1982 | Uhlmann | 137/625.17 X |

FOREIGN PATENT DOCUMENTS 2737479 2/1979 Fed. Rep. of Germany ... 137/625.4

Primary Examiner—Martin P. Schwadron
Assistant Examiner—John S. Starsiak, Jr.
Attorney, Agent, or Firm—Wm. T. Wofford; James C. Fails; Arthur F. Zobal

[57] ABSTRACT

In a single handle faucet valve of a type wherein a stem is interconnected with a control member so that movement of the stem moves the control member to vary hot and cold water mix and flow rate and wherein the stem includes a stem ball and there is provided bearing means for the stem ball, there is disclosed stem sealing means that is novel and advantageous.

3 Claims, 4 Drawing Figures

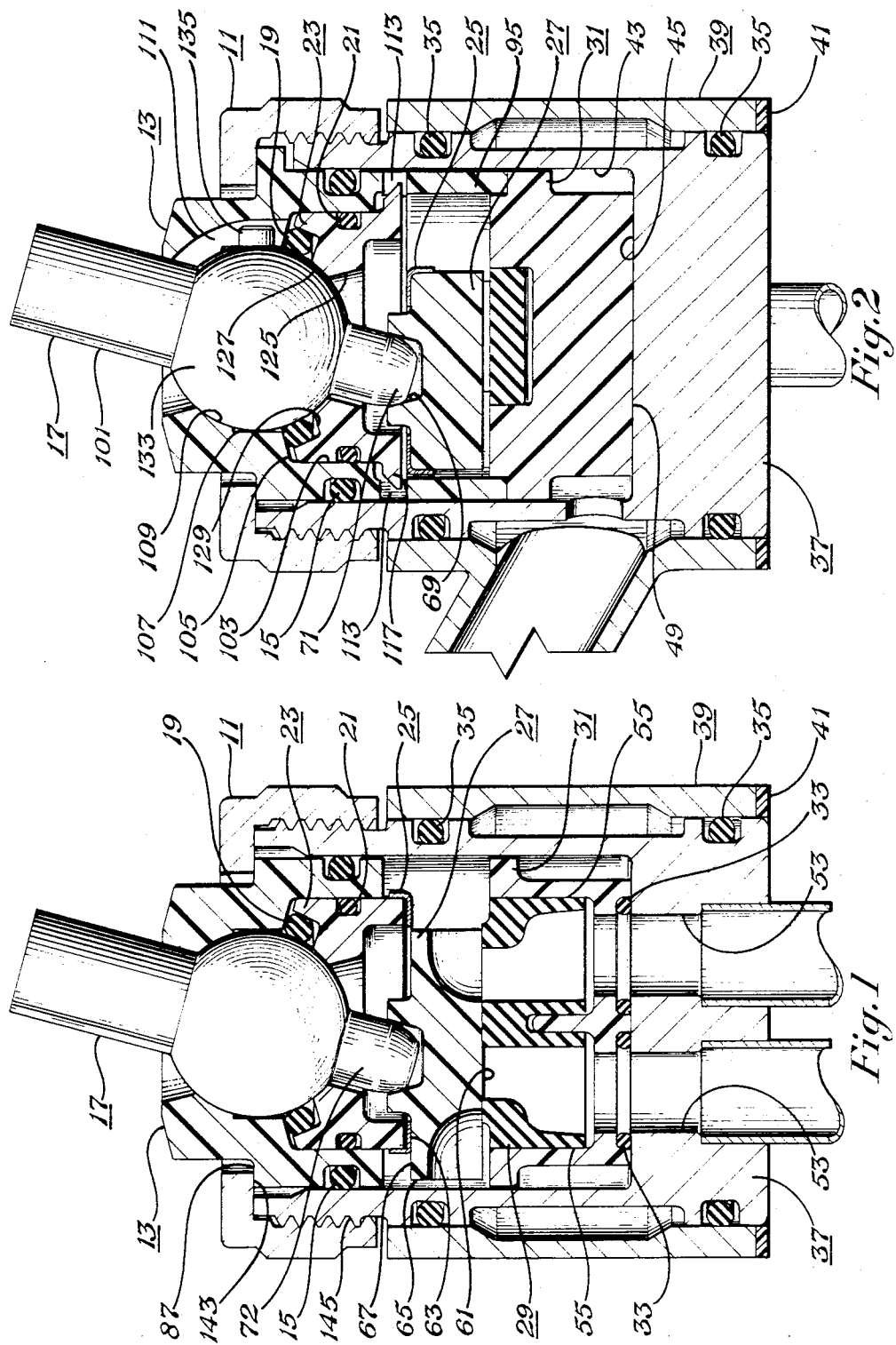

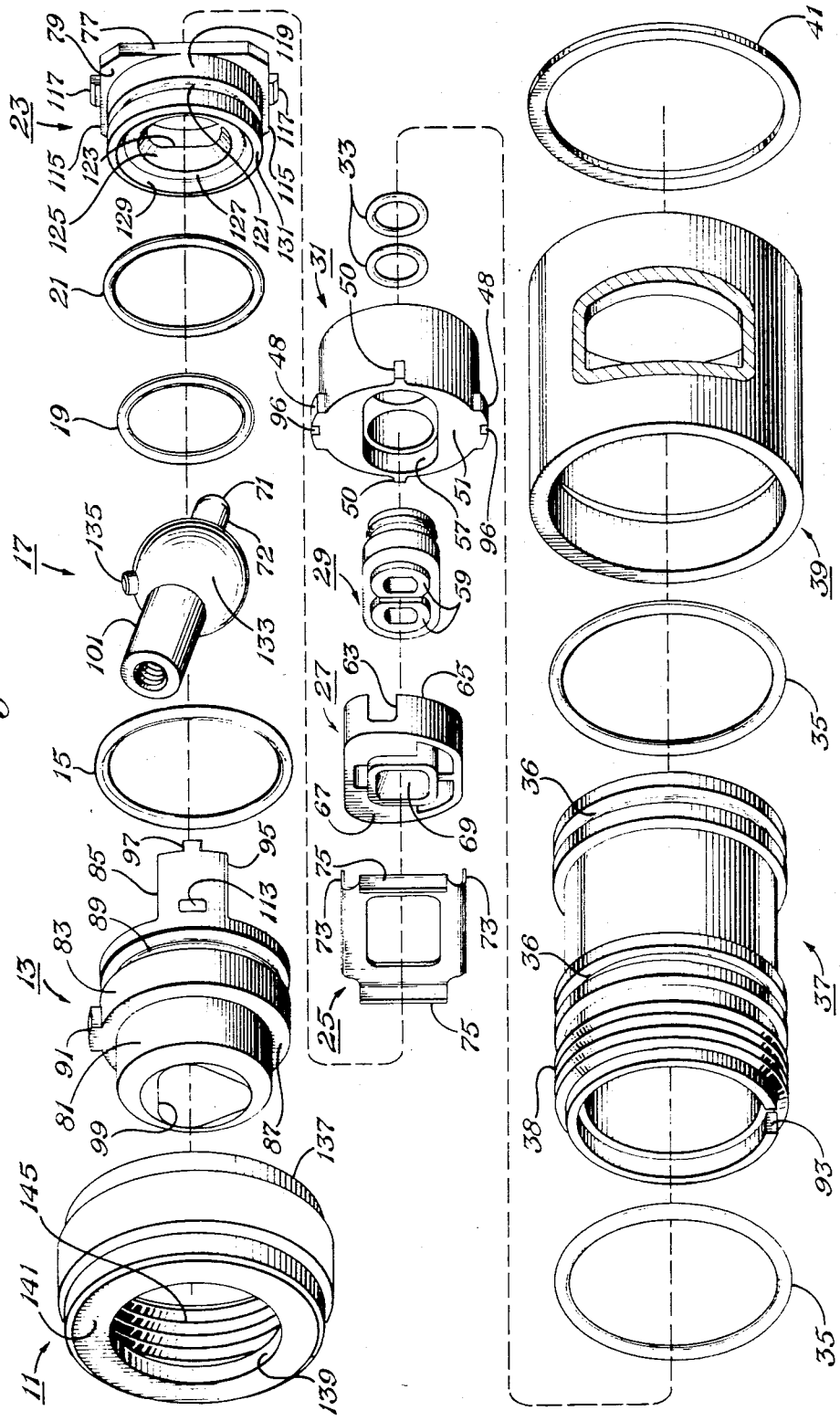

SINGLE HANDLE FAUCET VALVE

FIELD OF THE INVENTION

The invention relates to single handle faucet valves of the type used for kitchen sinks, lavatories, bath tubs, showers, and the like.

BACKGROUND OF THE INVENTION

A highly successful single handle faucet valve structure and arrangement is shown by Hayman U.S. Pat. No. 3,543,799, in which stem sealing is accomplished by a sealing ring 38 interposed between the planar upper surface of a control member 20 and the planar lower surface of a sealing member 25. It has become desirable, for the benefit of some market segments, to modify this structure and arrangement to reduce the physical dimensions so as to effect significant savings of materials. However, the desired reduction in physical dimensions precludes the stem sealing arrangement above mentioned for lack of requisite space.

It is known in the prior art, as exemplified by U.S. Pat. Nos. 3,384,119, to Manoogian, 3,965,935, to Morisseau and 4,226,260, to Schmitt to accomplish stem sealing in a single handle faucet valve by disposing a suitable sealing ring to coact with a ball portion of a valve stem. When the stem sealing is accomplished in this manner, reduction in faucet valve physical dimensions is feasible. However, such stem sealing, as disclosed by the prior art, does not provide certain advantages that are present in the arrangement shown by Hayman U.S. Pat. No. 3,543,799. It is accordingly the obJective of this invention to modify the structure and arrangement of Hayman U.S. Pat. No. 3,543,799 to utilize a suitable sealing ring that coacts with a ball portion of a valve stem to accomplish stem sealing, while at the same time retaining certain advantages of the Hayman U.S. Pat. No. 3,543,799 stem sealing arrangement.

SUMMARY OF THE INVENTION

The invention pertains to a novel and advantageous stem sealing means for a type of single handle faucet valve. Such single handle faucet valve incorporating stem sealing means in accordance with the invention will be briefly described. The single handle faucet valve would include valve body means defining a chamber having a longitudinal axis, hot and cold water inlets communicating with the chamber, and hot and cold water inlet porting seal means having openings communicating with the hot and cold water inlets. The single handle faucet valve would also include a control member with a surface having spaced openings therein movable in and out of registry with the inlet porting seal openings; stem means comprising a lever portion, a stem ball and a lower end portion; a retainer member comprising an upper stem ball seat, a stem bearing member comprising a lower stem ball seat and an upwardly facing sealing ring groove, and a stem ball sealing ring disposed in the upwardly facing sealing ring groove. The single handle faucet valve would further include means interconnecting the lower end portion of the stem with the control member so that movement of the stem moves the control member; means fixing the retainer member within the valve body chamber with the stem ball captured between the upper and lower stem ball seats. Means are provided to allow limited movement of the stem bearing member in the directions of the valve body longitudinal axis, so that the stem bearing member will move upwardly responsive to water pressure and its maximum upward movement will be limited by contact of the lower stem ball seat with the stem ball, thus permitting the compression of the stem ball sealing ring to vary with the magnitude of the water pressure and limiting its maximum compression. The stem ball sealing ring is preferably an o-ring seal.

BRIEF DESCRIPTION OF DRAWINGS

FIG. 1 is a longitudinal section view showing the entire assembly for a single handle faucet valve in accordance with a preferred embodiment of the invention.

FIG. 2 is a longitudinal section view displaced 90° from that of FIG. 1.

FIG. 3 is an exploded perspective view showing the various parts of the faucet valve of FIG. 1.

DESCRIPTION OF THE PREFERRED EMBODIMENTS

Figure 4:
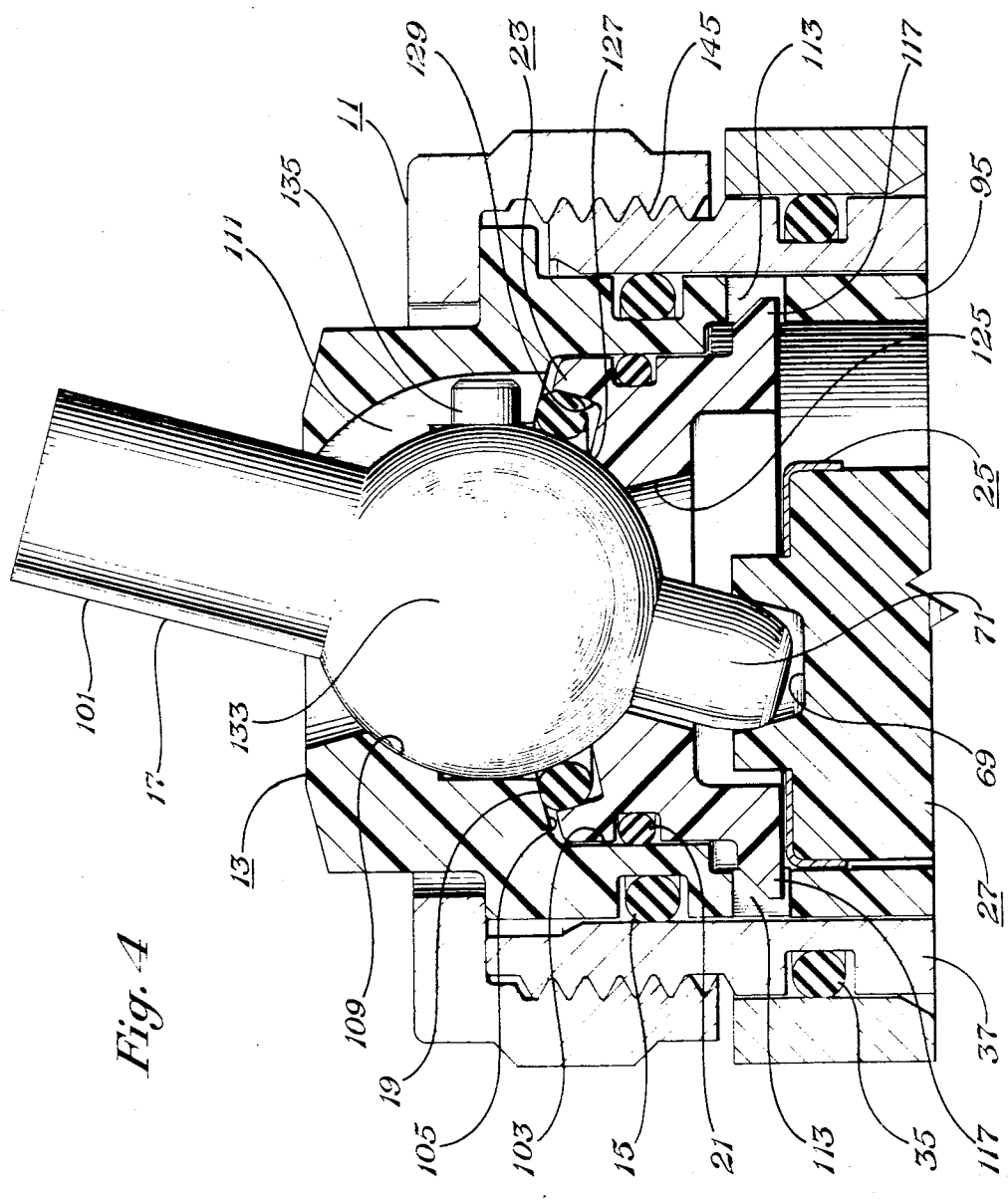
FIG. 4 is an enlarged portion of FIG. 2.

The various parts of a single handle faucet valve that embodies the invention are best shown by FIG. 3, and they include bonnet 11, retainer member 13, retainer peripheral o-ring seal 15, stem 17, stem ball o-ring seal 19, stem bearing member peripheral o-ring seal 21, stem bearing member 23, slide member 25, control disc 27, inlet porting seal housing 29, inlet porting disc 31, inlet port o-ring seals 33, spout member hub o-ring seals 35, valve body 37, spout member hub 39, and spout member hub bearing ring 41.

The valve body 37 is generally cylindrical, having an open end and a closed end, so that the valve body inner cylindrical wall 43 and planar inner closed end surface 45 define a chamber. The valve body is provided on its exterior with a pair of spaced peripheral grooves 36 for receiving spout member hub o-ring seals 35. The valve body is also provided at its exterior upper end portion a set of threads 38 for receiving bonnet 11. The inlet porting disc 31 has a generally cylindrical exterior surface 47 with a first pair of oppositely disposed protuberances 48 at its upper end portion and a second pair of oppositely disposed protuberances 50 displaced 90° from the first pair. The exterior surfaces of the protuberances 48, 50 are cylindrical and are matingly received by the valve body inner cylindrical wall 43. The first pair of protuberances 48 each has a slot 96 merging with the porting disc upper surface 51, for a purpose to be hereinafter explained. The inlet porting disc 31 also has a planar lower surface 49 that abuts the valve body inner closed end surface 45, and a planar upper surface 51. The valve body closed end is provided hot and cold water inlet openings 53 which are aligned with inlet openings 55 in the inlet porting disc 31. In the embodiment shown, the inlet porting disc 31 is provided a cavity 57 for matingly receiving the inlet porting seal housing 29, which incorporates conventional seal elements 59. The usual inlet port o-ring seals 33 are received by the lower end portion of the inlet openings in the inlet porting disc 31.

The control disc 27 has a planar lower surface 61 which engages the upper surfaces of the inlet porting seal elements 59. The control disc 27 is provided suitable control openings 63 which merge with planar lower surface 61 and the control disc side surface 65. The control disc 27 upper side 67 is provided a depression which forms a rack portion 69 for receiving a single gear tooth 71 which is formed on the lower end portion 72 of the stem 17. The metal slide member 25 has a pair of downturned flanges 73 that are matingly received by the controlled disc side surface 65 and a pair of upturned flanges 75 that are matingly received by a first pair of side surfaces 77 of a stem bearing member base portion 79.

The retainer 13, stem 17 and stem bearing member 23 make up a cartridge assembly. The retainer member 13 has a generally cylindrical exterior surface including an upper portion 81, an intermediate portion 83 and a lower portion 85. The upper portion 81, which is of smaller diameter than the intermediate portion 83 merges with same to form a shoulder 87. The intermediate portion 83 is provided a groove 89 to receive the retainer peripheral o-ring seal 15. The intermediate portion is also provided with a rectangular protrusion 91 which mates with an orientation notch 93 on the upper end of the valve body 37. The lower portion 85 forms the exterior of a pair of generally rectangular depending legs 95, each of which carries at its lower end a rectangular protuberance 97 that is matingly received by a respective slot 96 when the retainer member 13 is assembled relative to the inlet porting disc 31.

The retainer member 13 has a generally triangular opening 99 at its upper end portion, the side wall of which serves as a guide for lever portion 101 of the stem 17. The interior of the retainer member 13 includes a first cylindrical portion 103 which merges with a tapered shoulder portion 105, which in turn merges with a second cylindrical portion 107, which in turn merges with an upper stem ball seat 109. A slot 111 traverses the second cylindrical portion 107 and the upper stem ball seat 109 and is disposed symmetrically with respect to a plane that is a longitudinal bisector of the retainer member 13 and its legs 95. Each leg is provided a rectangular opening 113 at its upper end portion for a purpose to be hereinafter described.

The base portion 79 of stem bearing member 23, which is generally rectangular, has a second pair of side surfaces 115 which are, of course, perpendicular to the first pair 77. Centrally disposed on each of said second side surfaces 115 is a generally rectangular protuberance 117, for a purpose to be hereinafter described. The base portion 79 of the stem bearing member 23 merges with a cylindrical portion 119, which is provided a groove 121 to receive the stem bearing member peripheral o-ring seal 21. The stem bearing member 23 is provided a generally triangular opening 123 to permit passage of the lower end portion 72 of the stem 17. The side wall 125 of the triangular opening 123 merges with a lower stem ball seat 127, which in turn merges with a stem bearing member o-ring groove 129 which in turn merges with the upper end surface 131 of the stem bearing member 23.

The lever portion 101 of the stem 17 merges with a stem ball 133 which in turn merges with the stem lower end portion 72. Projecting from the upper hemisphere of the stem ball 133 is a guide pin 135 for a purpose to be hereinafter described.

To make up the cartridge assembly above-mentioned, the retainer peripheral o-ring seal 15 is placed in groove 89 and the stem 17 is installed in the retainer 13, with the lever portion 101 projecting through the triangular opening 99, the stem ball received in the upper stem ball seat 109, and the guide pin 135 disposed in the slot 111. The stem bearing member peripheral o-ring seal 21 is placed in the groove 121, the stem ball o-ring seal 19 is placed in the stem bearing member o-ring groove 129 and this assembly is inserted into the retainer member first cylindrical portion 103 with the protuberances 117 bearing on the inner surfaces of legs 95, forcing them to move slightly outwardly until the protuberances 117 are received by respective rectangular openings 113, at which time the legs 95 return to their normal positions and the stem bearing member 23 is locked on the retainer member 13.

The bonnet 11 is generally cylindrical and is open on one end 137 and is provided an internal flange 139 at the other end portion 141, with the inner surface of the internal flange 139 forming a shoulder 143. The bonnet 11 is provided internal threads 145 that merge with its open end and are adapted to be matingly received by the external threads 38 on the valve body 37. The diameter of the internal flange 39 is greater than the diameter of the retainer member upper portion cylindrical surface 81 but less than the diameter of the retainer member intermediate portion cylindrical surface 83, so that the bonnet shoulder 143 will engage retainer member shoulder 87 in assembly.

To assemble the single handle faucet valve, the inlet porting disc 31, with inlet port o-ring seals 33 and inlet porting seal housing 29 and conventional seal elements 59 all installed, is placed into valve body 27 so that its planar lower surface 49 is adjacent the valve body closed end surface 45 and so that the porting disc inlet openings 55 are aligned with the valve body hot and cold water inlet openings 53. The slide member 25 is then installed on the stem bearing member 23 and control disc 27 is installed on the slide, with the stem gear tooth 71 received by the control disc rack portion 69. This entire assembly is then inserted into the valve body so that legs 95 bottom out on the inlet porting disc planar upper surface 51 with the leg protuberances 97 being received by the respective slots 96 on the inlet porting disc protuberances 48, and the retainer member rectangular protrusion 91 being received by the valve body orientation notch 93.

Next, the spout member hub bearing ring 41 is installed on the valve body (the valve body having been mounted to a conventional base not shown) and the spout member hub o-ring seals 35 are installed in respective grooves 36 on the valve body 37. Then the spout member hub 39 is installed on the valve body 37 and the bonnet 11 is threaded onto the valve body. When the bonnet shoulder 143 contacts the retainer member shoulder 87, and as the bonnet continues downward, the retainer member 13 moves downward with its legs 95 bottomed out on the inlet porting disc upper planar surface 51, so that the inlet porting disc 31 also moves downward until its planar lower surface 49 bottoms out on the valve body closed end inner surface 45, at which time the threading of the bonnet 11 onto the valve body 37 is stopped. The depth of the valve body o-ring grooves that receive the inlet port o-ring seals 33 is such that when assembly is completed the o-ring seals 33 are properly compressed for sealing. The interrelation of the valve body orientation slot 93, retainer member rectangular protrusion 91, rectangular protuberances 97 of legs 95, and inlet porting disc slots 96 assures proper alignment of the relevant valve parts.

A primary aspect of this invention is the manner in which stem sealing is accomplished. As best seen in FIG. 4, clearance is provided between the stem bearing member protuberances 117 and the retainer member rectangular openings 113, and between the stem bearing member upper extremity and the retainer member shoulder portion 105, so that the stem bearing member 23 is allowed limited movement in the directions of the valve body central axis. The showings of FIGS. 1, 2 and 5 assume that the single handle faucet valve has been fully installed and is turned on to permit water flow and that the water pressure is sufficient to move the stem bearing member 23 upwardly so that the lower stem ball seat 127 is in contact with the stem ball 133. Whether or not the lower stem ball seat 127 will be in contact with the stem ball 133 will depend on the magnitude of the water pressure. The compression of the stem ball o-ring seal 19 will vary with the magnitude of the water pressure. The stem ball o-ring seal 19 is not subject to excessive compression, due to the fact that upward movement of the stem bearing member 23 is limited by contact of the lower stem ball seat 127 with the stem ball 133. Because the stem ball o-ring seal compression varies with water pressure magnitude and is not subject to excessive compression, wear on the stem ball o-ring seal 19 is minimized.

The foregoing disclosure and the showings made in the drawings are merely illustrative of the principles of this invention and are not to be interpreted in a limiting sense.

I claim:

1. In a single handle faucet valve, the combination comprising:
   a. valve body means defining a chamber having a longitudinal axis,
   b. hot and cold water inlets communicating with said chamber,
   c. hot and cold water inlet porting seal means having openings communicating with said hot and cold water inlets,
   d. a control member with a surface having spaced openings therein movable into and out of registry with said inlet porting seal openings,
   e. stem means comprising a lever portion a stem ball and a lower end portion,
   f. a retainer member comprising an upper stem ball seat,
   g. a stem bearing member comprising a lower stem ball seat and an upwardly facing sealing ring groove,
   h. a stem ball sealing ring disposed in said upwardly facing sealing ring groove,
   i. means interconnecting the lower end portion of said stem with said control member so that movement of said stem moves said control member,
   j. means fixing said retainer member within said valve body chamber with said stem ball captured between said upper and lower stem ball seats,
   k. means allowing limited movement of said stem bearing member in the directions of the longitudinal axis of said valve body, so that said stem bearing member will move upwardly responsive to water pressure and its maximum upward movement will be limited by contact of said lower stem ball seat with said stem ball, thus permitting the compression of said sealing ring to vary with magnitude of the water pressure and limiting its maximum compression.

2. The device of claim 1 wherein said means fixing said retainer member within said valve body comprises a bonnet threaded onto said valve body.

3. The device of claim 1 wherein said stem ball sealing ring is an o-ring seal.

* * * * *